United States Patent
Yoneda et al.

[19]

[11] Patent Number: 6,075,671
[45] Date of Patent: Jun. 13, 2000

[54] METHOD FOR UNSTICKING A HEAD/SLIDER ASSEMBLY FROM A SURFACE OF A MAGNETIC RECORDING DISK AND A DISK DRIVE DEVICE

[75] Inventors: Isao Yoneda, Yokohama; Shusuke Kurihara, Yamato, both of Japan

[73] Assignee: International Business Machines Corporation, Armonk, N.Y.

[21] Appl. No.: 09/099,709

[22] Filed: Jun. 19, 1998

[30] Foreign Application Priority Data

Jun. 25, 1997 [JP] Japan ................................ 9-168755

[51] Int. Cl.[7] .................................................. G11B 21/02
[52] U.S. Cl. ................................................................ 360/75
[58] Field of Search ............................. 360/75, 97.01, 360/105, 77.01, 77.02, 78.04, 78.06, 69, 128

[56] References Cited

U.S. PATENT DOCUMENTS 5,384,675   1/1995   Crawforth et al. ........................ 360/75

*Primary Examiner*—Muhammad Edun
*Attorney, Agent, or Firm*—Robert B. Martin

[57] ABSTRACT

The invention relates to magnetic recording devices and a method for unsticking a head/slider assembly stuck on the surface of a magnetic recording disk. The method includes a first step which determines a resonant frequency of a mechanical system containing a magnetic recording disk, a head/slider assembly and a flexible support arm in which the resonant frequency of the mechanical system varies depending upon a position of the head/slider assembly on the surface of the magnetic recording disk, and a second step which oscillates the spindle motor and/or the voice coil motor at the resonant frequency to unstick the head/slider assembly from the surface of the magnetic recording disk.

12 Claims, 9 Drawing Sheets

(A)

(B)

METHOD FOR UNSTICKING A HEAD/SLIDER ASSEMBLY FROM A SURFACE OF A MAGNETIC RECORDING DISK AND A DISK DRIVE DEVICE

BACKGROUND OF THE INVENTION

1. Field of the Invention

The present invention relates to a method for unsticking a head/slider assembly stuck on the surface of a recording disk rotated by a drive motor, and relates to a disk drive device performing an operation for unsticking the head/slider assembly from the recording surface.

2. Description of Related Art

A hard disk drive device contains at least one magnetic recording disk, and data are stored on both surfaces of the magnetic recording disk. One read/write head is provided for each recording surface. The read/write head is mounted on a slider, and these are called a head/slider assembly. The head/slider assembly is mounted on the front end of a flexible support arm, the rear end of which is pivotally mounted on a frame of the hard disk drive device. The magnetic recording disk is rotated by a spindle motor, and the supporting arm which supports the head/slider assembly is rotated around a pivot point in a radial direction of the magnetic recording disk by a voice coil motor (VCM).

A contact start/stop (CSS) scheme or a load/unload scheme is used in the hard disk drive device. In the CSS scheme, the head/slider assembly is landed on a rest region or a non-recording region located inside the inner most recording track on the surface of the magnetic recording disk during a standby period, and takes off from the surface of the rest region when the magnetic recording disk is rotated.

In the load/unload scheme, a ramp element is mounted at a peripheral of the magnetic recording disk. A surface of the ramp element is ramped, and a front end of the head/slider assembly is moved by the VCM to ride on the ramped surface so that the head/slider assembly rests on the ramp element during the standby period.

In the CSS scheme, the head/slider assembly is contacted to the rest region by a bias force applied by the flexible support arm during the standby period. During the contact to the rest region, the head/slider assembly tends to stick to the rest region, so that the magnetic recording disk does not rotate when the spindle motor is activated to read or write the data.

Japanese laid open patent application 8-203193 discloses a technology for unsticking the head/slider assembly from the surface of the magnetic recording disk by moving the disk in both the forward and backward direction and moving the head/slider assembly in both the forward and backward direction. The movement of the forward and backward direction is called as an oscillation or a vibration. In the application, a natural oscillation frequency of the read/write head is stored in a memory, and both the spindle motor and VCM are vibrated at the natural oscillation frequency to unstick the head/slider assembly from the surface of the disk.

In the load/unload scheme, the head/slider assembly always flies above the surface of the magnetic recording disk. Since the head/slider assembly does not land on the surface of the disk, the surface of the disk can be polished to provide a smooth surface to reduce a flying height of the head/slider assembly, so that a data capacity is increased and a S/N ratio is improved.

Due to the reduced flying height, the head/slider assembly tends to stick on the surface of the magnetic recording disk during the read/write period. Since the head/slider assembly is moved across data recording tracks on the disk during the read/write period, the position at which the head/slider assembly sticks to the disk is unknown. A mechanical natural oscillation frequency of a mechanical system containing the magnetic recording disk, the head/slider assembly and the flexible support arm varies depending upon the position of the read/write head on the surface of the magnetic recording disk and the number of the stuck heads.

Another prior art technology unsticks the stuck head/slider assembly from the surface of the disk by steps of (1) selecting a frequency range $f_{MIN}$–$f_{MAX}$, which is selected on the assumption that a resonant frequency $f_0$ exists in this frequency range, and selecting an amplitude of current applied to the spindle motor; (2) vibrating the spindle motor and the magnetic recording disk, that is, moving them in the forward and backward direction, at the frequency $f_{MIN}$; (3) vibrating the spindle motor and the magnetic recording disk at the frequency $f_{MIN}+\Delta f$, by applying the selected amplitude of current of the frequency $f_{MIN}+\Delta f$ to the spindle motor; (4) vibrating the spindle motor and the magnetic recording disk at the frequency $f_{MIN}+2\Delta f$, by applying the selected amplitude of current of the frequency $f_{MIN}+2\Delta f$ to the spindle motor; and (5) the above steps are repeated by increasing the frequency until the frequency reached the frequency $f_{MAX}$.

This prior approach always changes the frequency of the vibration from the frequency $f_{MIN}$ to the frequency $f_{MAX}$. It is apparent that it takes a long time period to reach from the frequency $f_{MIN}$ to the frequency $f_{MAX}$.

SUMMARY OF THE INVENTION

The invention performs an operation including a first mode which finds out the resonant frequency of the mechanical system containing the magnetic recording disk, the head/slider assembly and the flexible support arm in which the resonant frequency of the mechanical system varies depending upon the position of the head/slider assembly on the surface of the magnetic recording disk, and a second mode which oscillates at least one of a spindle motor and a voice coil motor at the found resonant frequency to unstick the stuck head/slider assembly from the surface of the magnetic recording disk, whereby the time period for unsticking the stuck head/slider assembly from the surface of the disk is remarkably decreased.

The method in accordance with the present invention includes steps of:

(a) setting a frequency range defined by two frequencies between which a resonant frequency of a mechanical system containing head/slider assembly, the support arm, the recording disk and the drive motor exists;

(b) successively selecting different one of a plurality of frequencies in the frequency range as a frequency of alternate drive signals applied to the drive motor to oscillate the recording disk, the stuck head/slider assembly and the support arm in each successive frequency;

(c) detecting an amplitude of the counterelectromotive force induced in the voice coil motor in each successive frequency;

(d) selecting a frequency at which the largest amplitude of the counterelectromotive force is generated; and (e) applying the alternate drive signals at the selected frequency to the drive motor.

The method in accordance with the present invention further includes steps of:

(a) setting a first frequency range defined by two frequencies between which a resonant frequency of a mechanical system containing the head/slider assembly, the support arm, the recording disk, and the drive motor exists;

(b) successively selecting different one of a plurality of frequencies in the first frequency range as a frequency of alternate drive signals applied to the drive motor to oscillate the recording disk, the stuck head/slider assembly and the support arm in each successive frequency;

(c) detecting an amplitude of the counterelectromotive force induced in the voice coil motor in each successive frequency;

(d) selecting a frequency at which the largest amplitude of the counterelectromotive force is generated;

(e) setting a second frequency range containing the selected frequency, which is narrower than the first frequency range; and (f) applying the alternate drive signals at successively selected different one of a plurality of frequencies in the second frequency range to the drive motor.

A disk drive device in accordance with the present invention comprises:

a first detecting means for detecting a sticking of the head/slider assembly to the surface of the recording disk to generate a detecting signal;

a setting means responding to the detecting signal for setting a frequency range defined by two frequencies between which a resonant frequency of a mechanical system containing the head/slider assembly, the support arm, the recording disk, and the drive motor exists;

an actuating means for successively selecting different one of a plurality of frequencies in the frequency range as a frequency of alternate drive signals applied to the drive motor to oscillate the recording disk, the stuck head/slider assembly and the support arm in each successive frequency;

a second detecting means for detecting an amplitude of the counterelectromotive force induced in the voice coil motor in each successive frequency;

a selecting means for selecting a frequency at which the largest amplitude of the counterelectromotive force is generated; and an applying means for applying the alternate drive signals at a selected frequency to the drive motor.

A disk drive device in accordance with the present invention further comprises:

a first detecting means for detecting a sticking of the head/slider assembly to the surface of the recording disk to generate a detecting signal;

a first setting means responding to the detecting signal for setting a first frequency range defined by two frequencies between which a resonant frequency of a mechanical system containing the head/slider assembly, the support arm, the recording disk, and the drive motor exists;

an actuating means for successively selecting different one of a plurality of frequencies in the first frequency range as a frequency of alternate drive signals applied to the drive motor to oscillate the recording disk, the stuck head/slider assembly and the support arm in each successive frequency;

a second detecting means for detecting an amplitude of the counterelectromotive force induced in the voice coil motor in each successive frequency;

a selecting means for selecting a frequency at which the largest amplitude of the counterelectromotive force is generated;

a second setting means for setting a second frequency range containing the selected frequency, which is narrower than the first frequency range; and an applying means for applying the alternate drive signals at successively selected one of a plurality of frequencies in the second frequency range to the drive motor to oscillate the recording disk.

Other objects, features, and advantages of the present invention will be apparent from the accompanying drawings and from the detailed description below.

BRIEF DESCRIPTION OF THE DRAWINGS

The present invention is illustrated by way of example and in the figures of the accompanying drawings, in which like references indicate similar elements, and in which.

DETAILED DESCRIPTION OF THE PREFERRED EMBODIMENT

Figure 1:
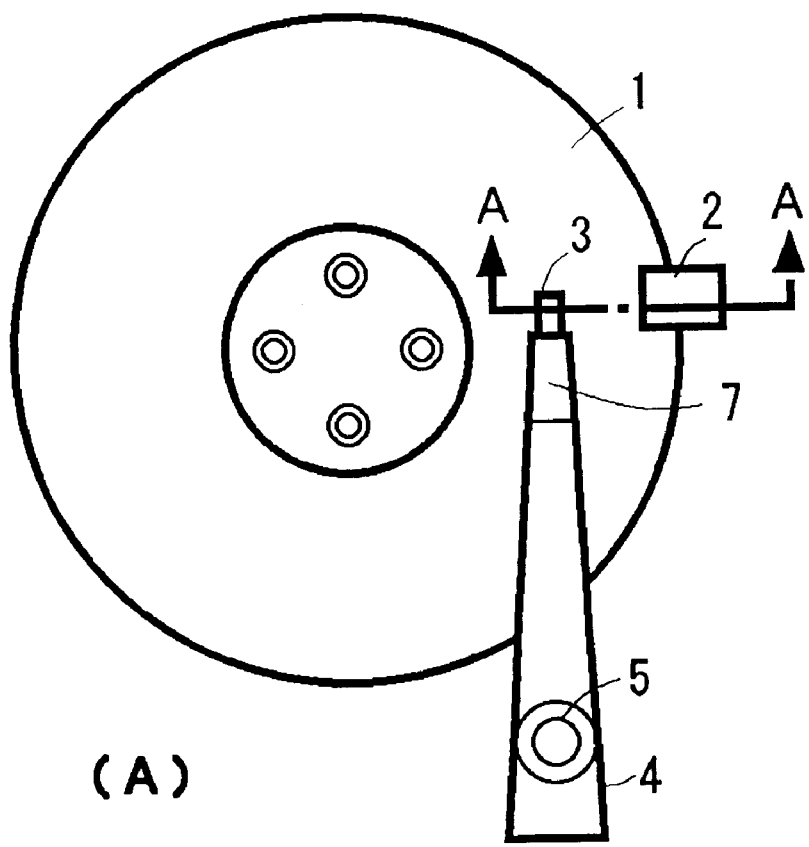
FIG. 1 shows the load/unload scheme of the hard disk drive device.
Figure 1:
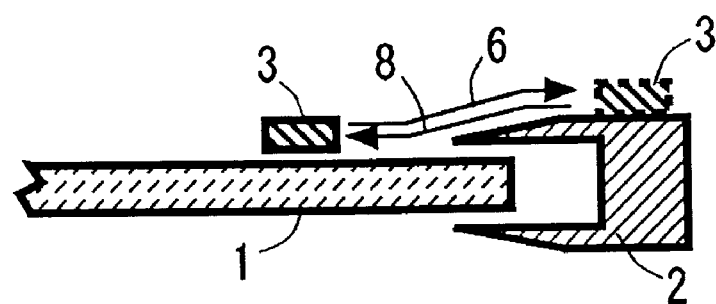

FIGS. 1(A) and 1(B) show the load/unload scheme of the hard disk drive device. A ramp element 2 is mounted at the peripheral of a magnetic recording disk 1. The surface of the ramp element 2 is ramped, and a front end 3 of a head support arm 4 rides on the ramped surface of the ramp element 2, and moves in the direction of an arrow 6 to a rest position of the ramp element 2, as shown in FIG. 1(B), when the support arm 4 is rotated around a pivot point 5 in the clockwise direction in FIG. 1(A). When the read/write operation is started, the magnetic recording disk 1 is rotated by a drive motor or a spindle motor 13 shown in FIG. 2, and the support arm 4 is moved from the rest position in a direction of an arrow 8, and is moved to a flying position above the magnetic recording disk 1 to read the data from the disk 1 or write the data into the disk 1.

The rotational speed, i.e., the revolutions per minute (RPM), of the magnetic recording disk 1 is so designed to generate an air bearing with an appropriate pressure which causes the head/slider assembly 7 of the support arm 4 to fly above the surface of the magnetic recording disk 1.

Figure 2:
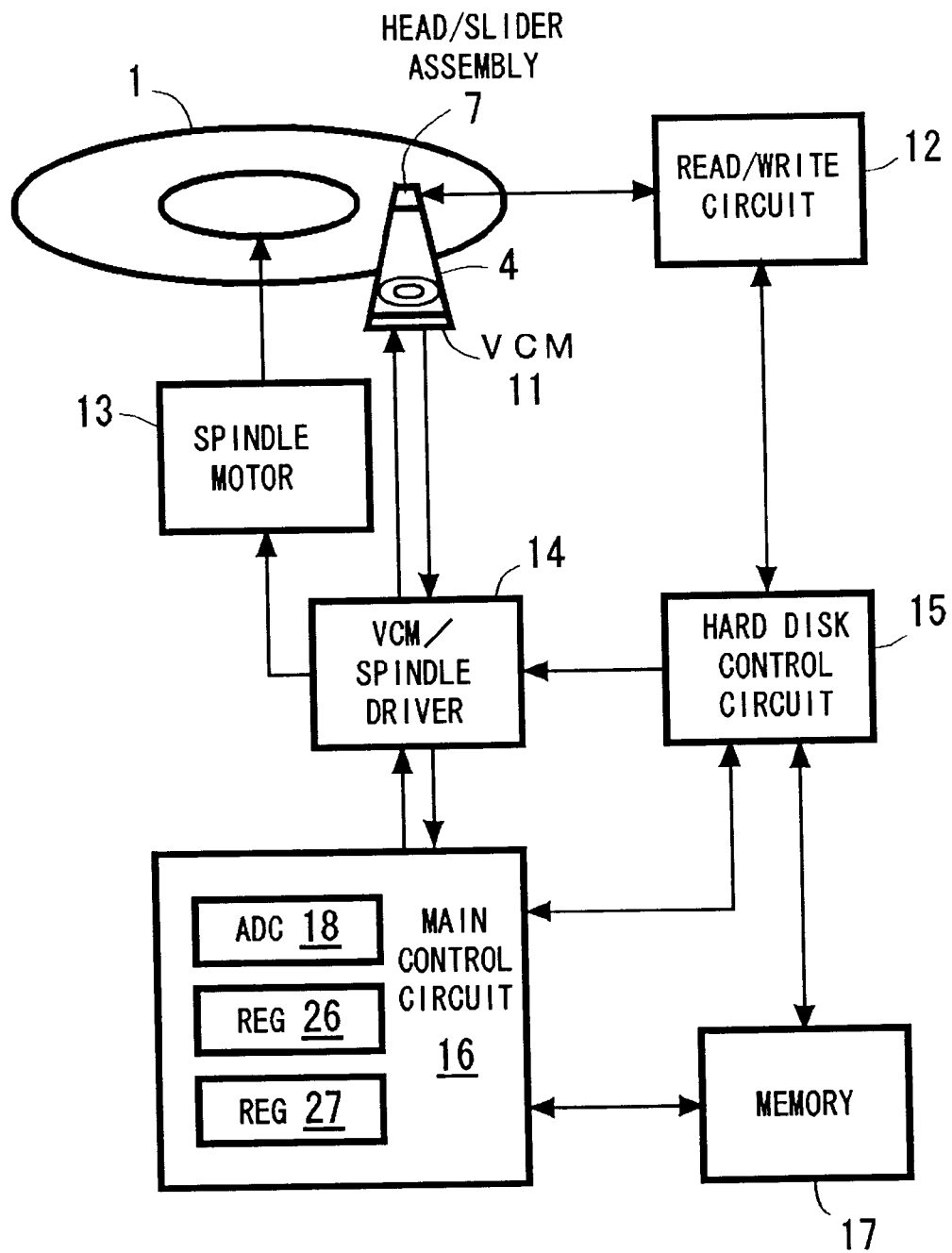
FIG. 2 shows the block diagram of the circuit of the hard disk drive device of the present invention.

FIG. 2 shows a block diagram of the circuits contained in the hard disk drive device. The spindle motor 13 for rotating the magnetic recording disk 1 and a VCM 11 are controlled by a VCM/spindle driver 14. A read/write circuit 12 is connected to a hard disk control circuit 15, which in turn is also connected to a VCM/spindle driver 14. A memory 17 is connected to the circuit 15 and a main control circuit 16, such as CPU which controls the VCM/spindle driver 14, the hard disk control circuit 15 and the memory 17. The main control circuit 16 contains an analog digital converter (ADC) 18, a $V_{ADCMAX}$ register 26 and a frequency register 27. For simplifying the drawing, the ramp element 2 is not shown in FIG. 2.

To decrease the time period for unsticking a stuck head/slider assembly 7 from the surface of the disk 1, the present invention performs the operation including the first mode which finds out the resonant frequency $f_0$ of the mechanical system containing the magnetic recording disk 1, the head/slider assembly 7 and the flexible support arm 4, and the second mode which vibrates or oscillates at least of the spindle motor 13 and the VCM 11 at the resonant frequency $f_0$ or frequencies near to the resonant frequency $f_0$ to unstick the stuck head/slider assembly 7 from the surface of the magnetic recording disk 1.

Figure 3:
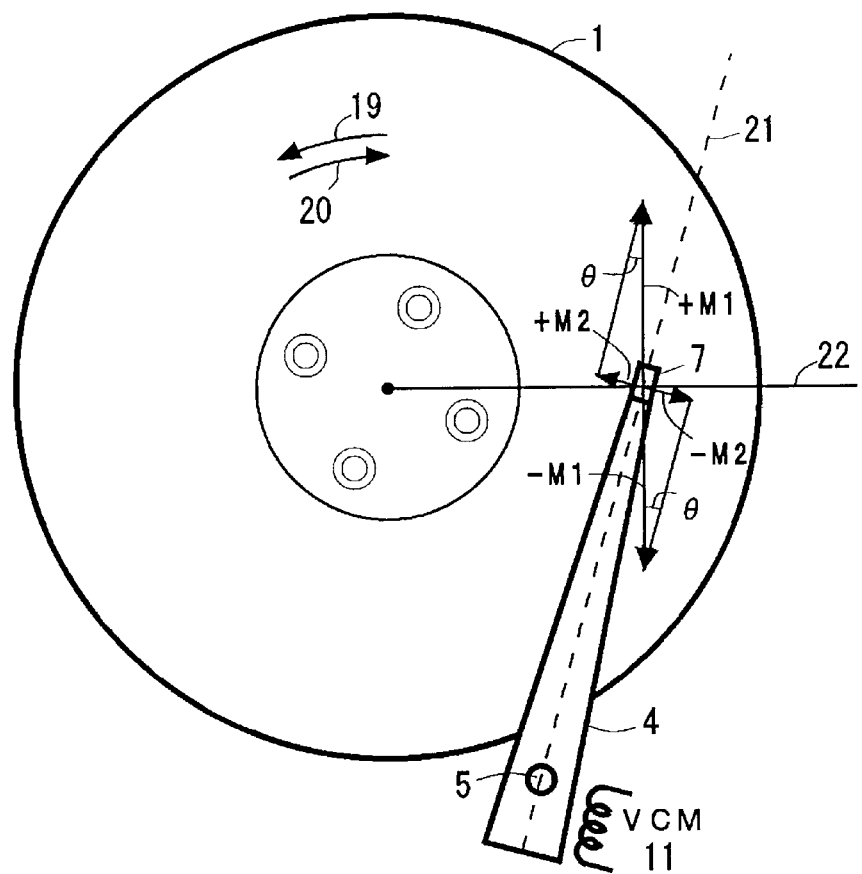
FIG. 3 shows the basic concept of the operation of the present invention.

Referring to FIG. 3, it is assumed that the head/slider assembly 7 sticks on the surface of the magnetic recording disk 1 at a shown position. FIG. 3 shows the basic concept of the present invention for finding the resonant frequency $f_0$ of the mechanical system by detecting the counterelectromotive force, i.e., a back electromotive force, which is induced in the VCM 11 when the disk 1 is alternately moved in a direction 19 and a direction 20. The alternate movement of the disk 1 is called a vibration or an oscillation in the specification.

Figure 4:
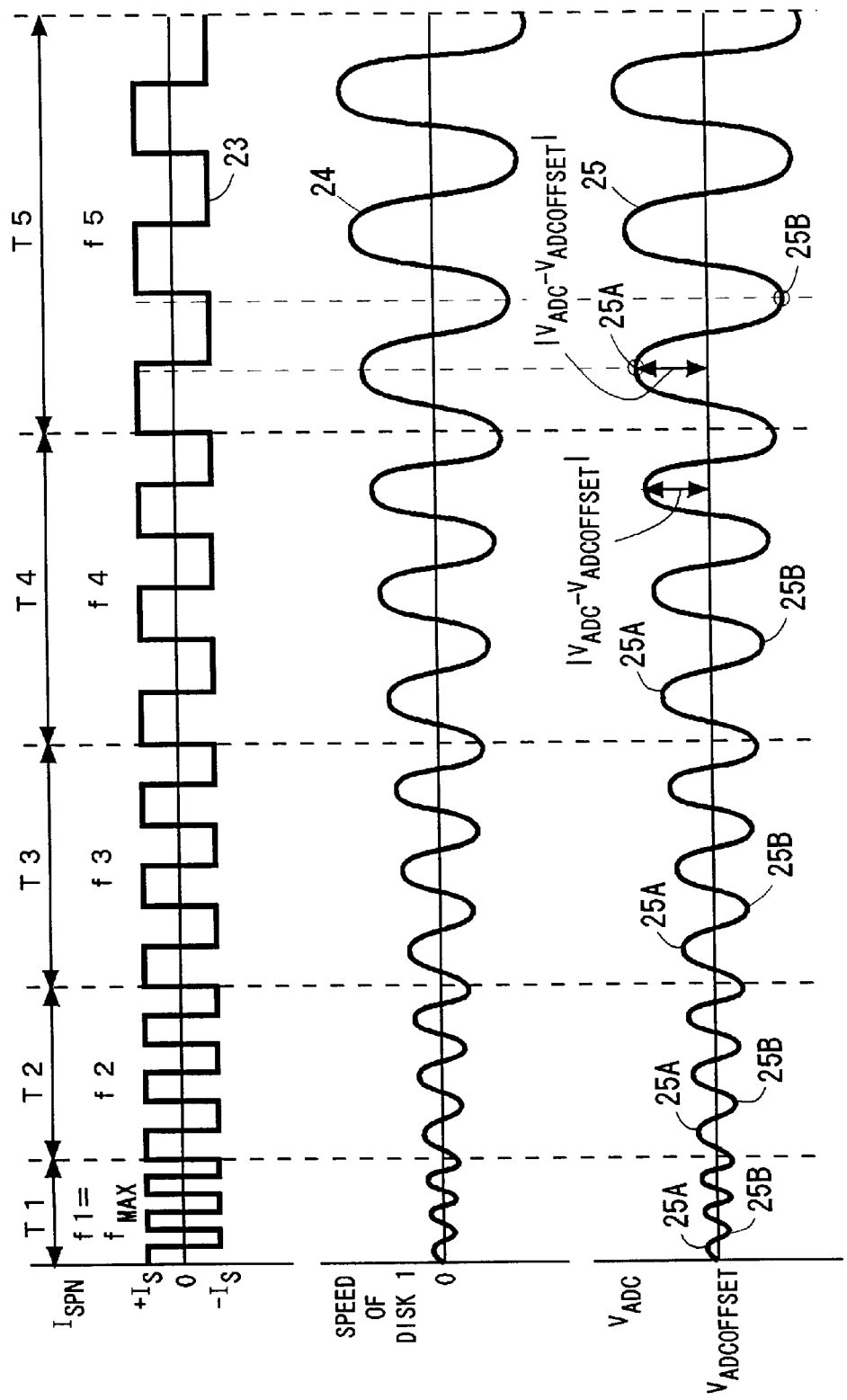
FIG. 4 shows the wave forms of the current applied to the spindle motor, the speed of the disk and the counterelectromotive force induced in the VCM coil.
Figure 5:
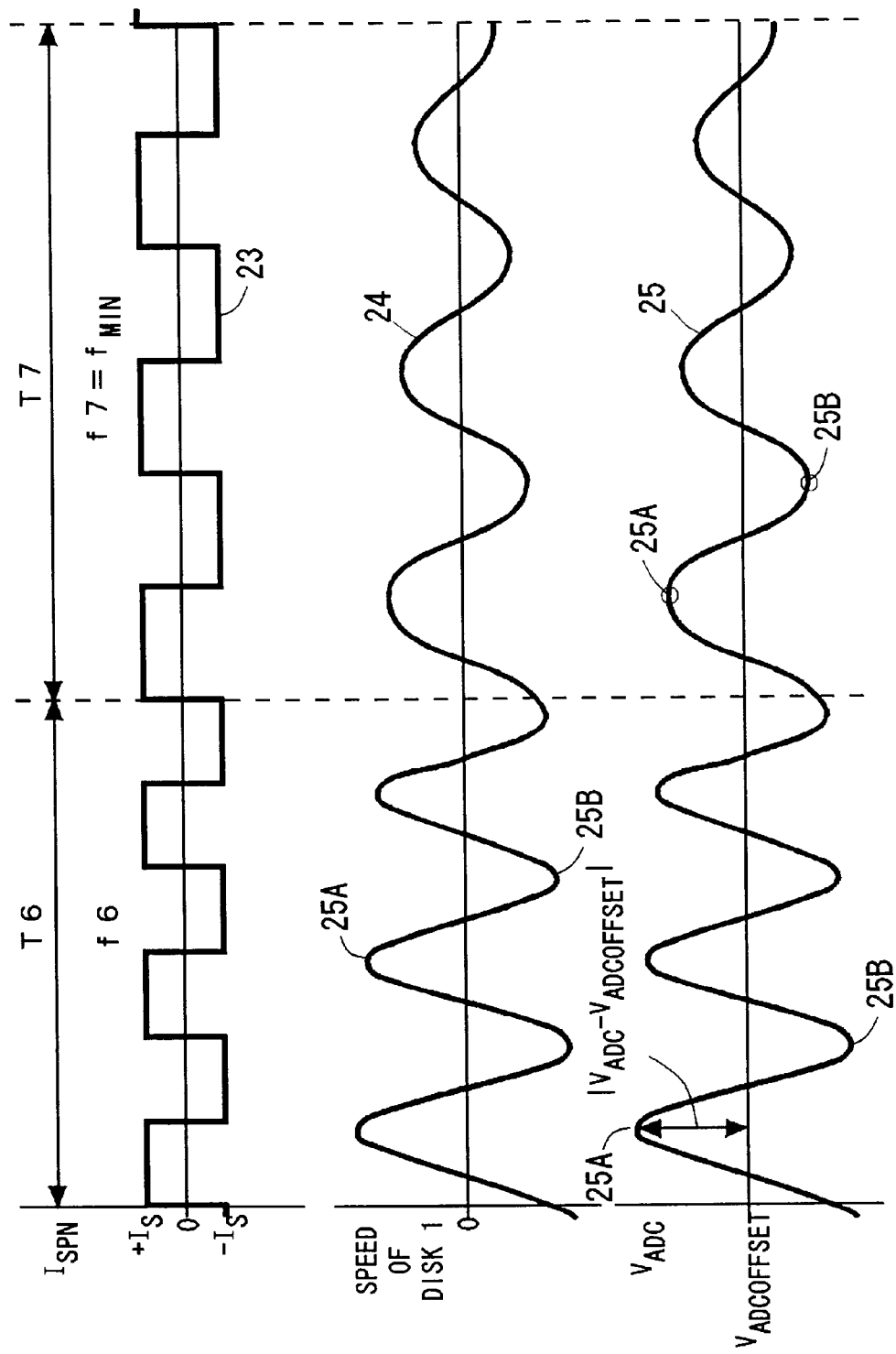
FIG. 5 shows the wave forms of the current applied to the spindle motor, the speed of the disk and the counterelectromotive force induced in the VCM coil.

The vibration or the oscillation of the disk 1 is performed by applying alternate drive signals or alternate drive pulses 23, shown in FIGS. 4 and 5, to the spindle motor 13.

A frequency range $f_{MIN}$–$f_{MAX}$ for oscillating the spindle motor 13 is predetermined based upon an experimental knowledge that the resonant frequency $f_0$ exists in the frequency range $f_{MIN}$–$f_{MAX}$. At the resonant frequency $f_0$, an amount of movement +M1 and an amount of movement −M1 of the disk 1 in the direction which is perpendicular to a radial direction 22 of the disk 1 becomes maximum, thereby it is possible to unstick the stuck head/slider assembly 7 from the surface of the disk 1.

Describing in more detail, when the disk 1 is moved in the direction 19, the amount of movement +M1 relative to the stuck head/slider assembly 7 produces a vector component +M2, which is perpendicular to a center line 21 of the support arm 4. The vector component +M2 is expressed by +M2=+M1 sin θ. Therefore, the stuck head/slider assembly is moved by the vector component +M2.

When the disk 1 is moved in the direction 20, the amount of movement −M1 relative to the head/slider assembly 7 produces a vector component −M2, which is perpendicular to a center line 21 of the support arm 4. The vector component −M2 is expressed by −M2=−M1 sin θ. Therefore, the stuck head/slider assembly is moved by the vector component −M2.

In this manner, the support arm 4 and the head/slider assembly 7 are alternately moved from its center line 21 by the vector component or the distance +M2 and −M2 when the disk 1 is vibrated or oscillated. The movement, i.e., the oscillation, of the support arm 4 and the head/slider assembly 7 is synchronized with the oscillation of the disk 1. The larger the amount of movement +M1 and −M1 is, the larger is the vector components +M2 and −M2. The vector components +M1 and −M1 cause the VCM 11 to generate the counterelectromotive force $V_{ADC}$. It is noted that the counterelectromotive force is called as $V_{ADC}$ since it is applied to an input of the ADC 18 in the main control circuit 16 shown in FIG. 2.

Describing more particularly with reference to FIG. 4, a waveform 23 represents the drive current $I_{SPN}=\pm I_S$ alternately applied to the spindle motor 13, a waveform 24 represents a speed of the disk 1, and a waveform 25 represents the counterelectromotive force $V_{ADC}$, which is generated by the VCM 11 and applied to the ADC 18. Referring to the waveform in a time period T5, for example, the speed of the disk 1 varies as shown by the curve 24 when the drive current $I_{SPN}=\pm I_S$ is alternately applied to the spindle motor 13, whereby the VCM 11 generates the waveform 25 which is synchronized with the speed of the disk 1. It is noted that peaks 25A and 25B of the $V_{ADC}$ are located just before a falling edge or a rising edge of the waveform 23, respectively.

In accordance with the present invention, the main control circuit 16 determines whether or not the head/slider assembly 7 is stuck on the surface of the disk 1. The main control circuit 16 detects the rotation of the spindle motor 13 in the following manner. When the three-phase spindle motor 13 is rotated by drive pulses, not shown in the drawings, applied by the VCM/spindle driver 14, a pulse train induced by the rotation of the three-phase coils of the spindle motor 13 in synchronous with the rotation is detected by a detecting device, not shown in the drawings. The detecting device supplies the pulse train to the main control circuit 16. The main control circuit 16 monitors the pulse train to determine whether the spindle motor 13 is being rotated, or not. If the main control circuit 16 detects the stop of the pulse train, the circuit 16 treats this condition as the sticking.

Figure 6:
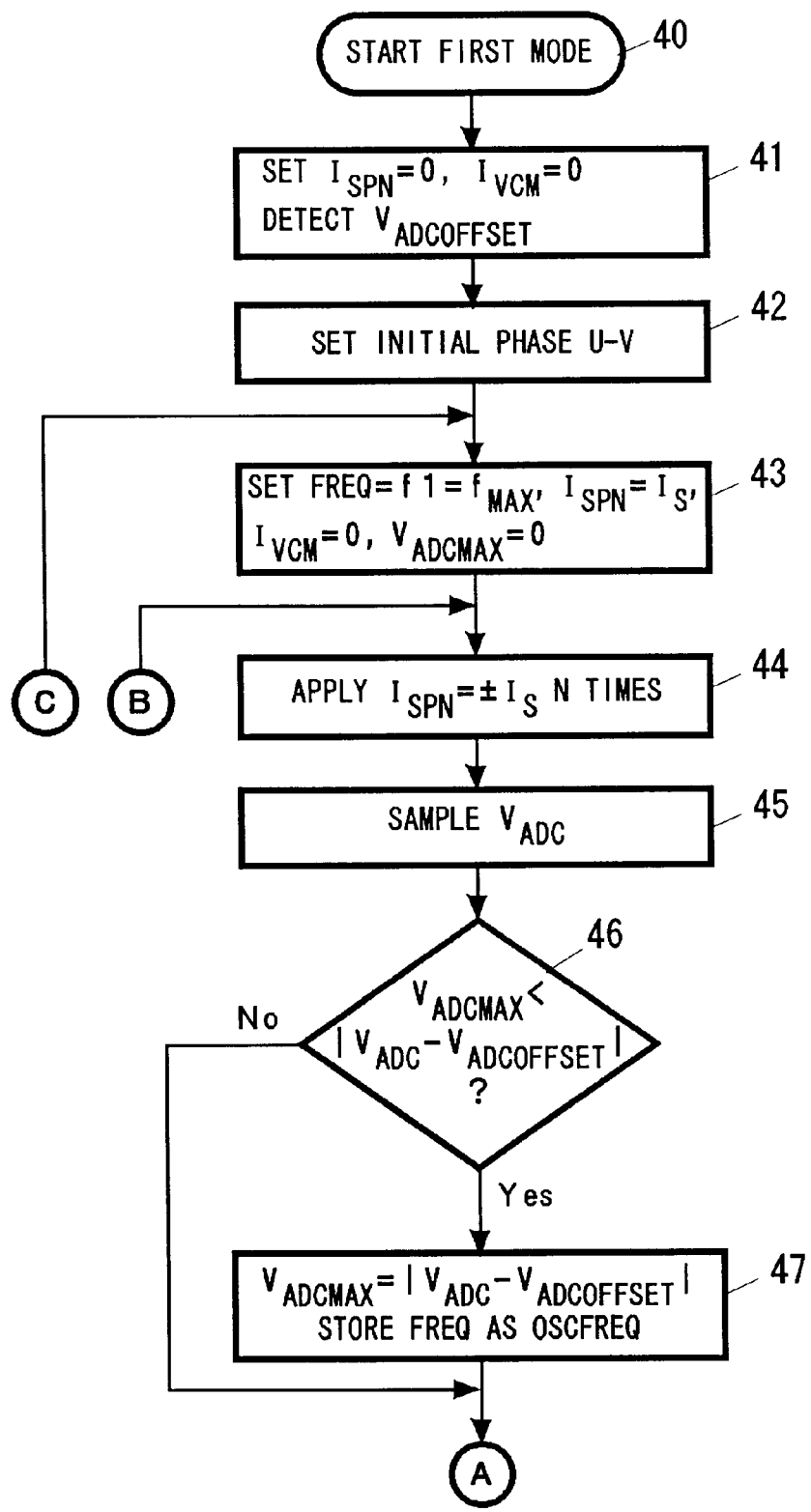
FIG. 6 shows the flow chart of the operation performed in accordance with the present invention.
Figure 7:
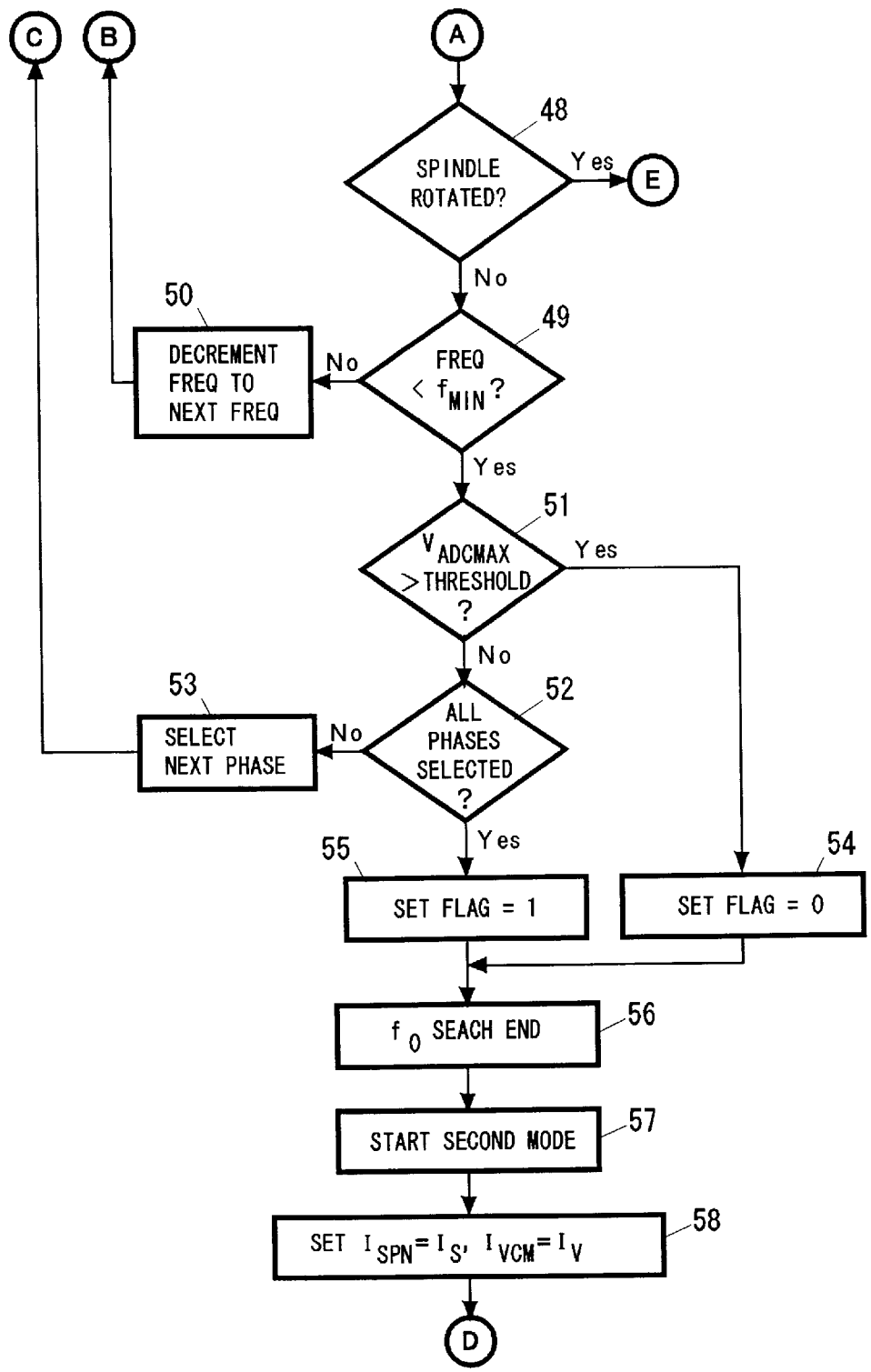
FIG. 7 shows the flow chart of the operation performed in accordance with the present invention.
Figure 8:
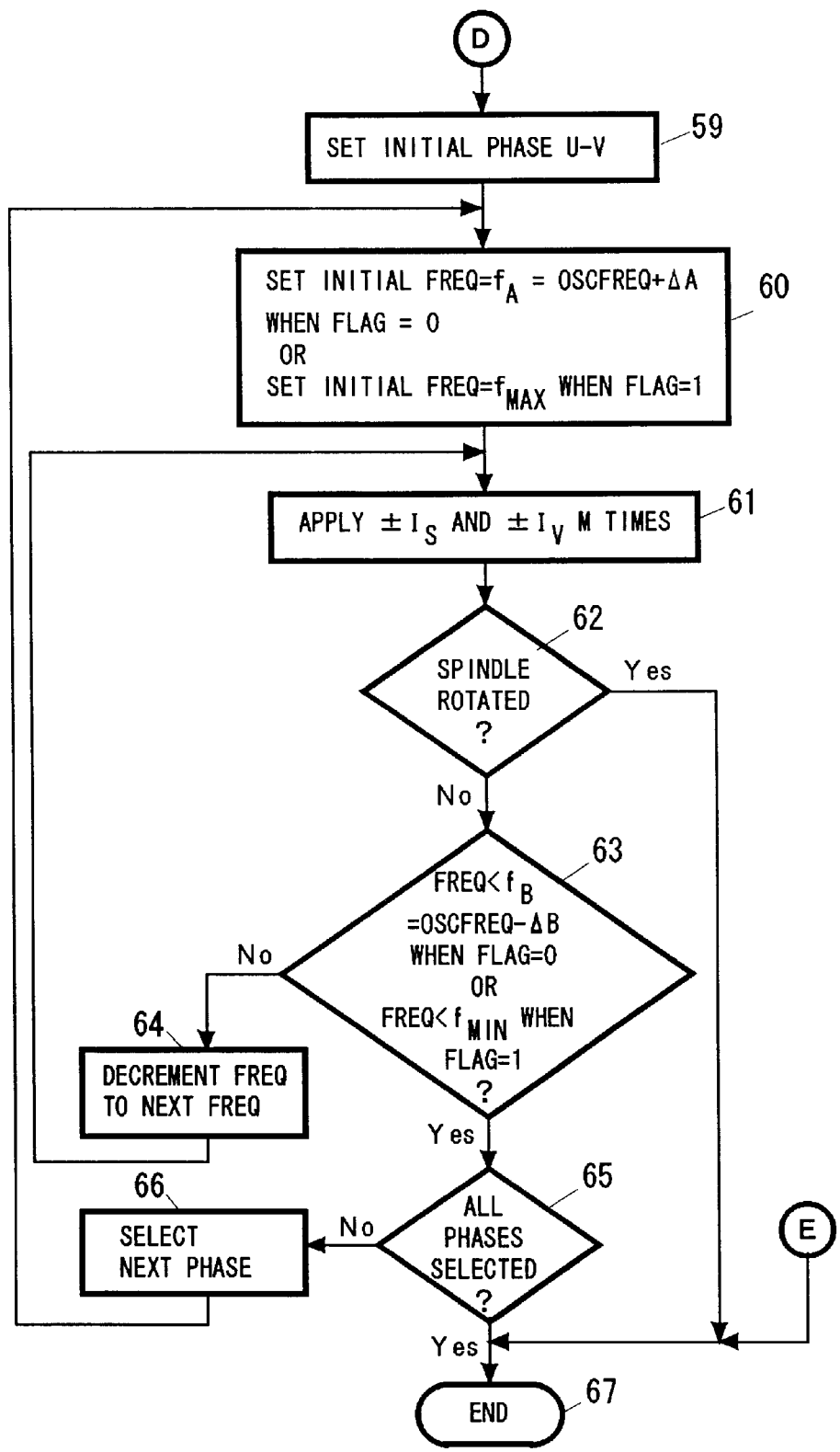
FIG. 8 shows the flow chart of the operation performed in accordance with the present invention.

If the main control circuit 16 detects the sticking of the head/slider assembly 7 to the surface of the disk 1, the main control circuit 16 starts the operation shown in FIGS. 6, 7 and 8. It is noted that the operation of FIGS. 6, 7 and 8 are performed under the control of the main control circuit 16. As described before, the operation includes the first mode for detecting the resonant frequency $f_0$ and the second mode for vibrating or oscillating at least one of the VCM 11 and the spindle motor 13 to unstick the stuck head/slider assembly from the surface of the disk 1. It is preferable to oscillate both the VCM 11 and the spindle motor 13.

The main control circuit 16 performs the operation, including the steps of:

(a) setting a frequency range defined by two frequencies $f_{MIN}$ and $f_{MAX}$ between which a resonant frequency of a mechanical system containing the head/slider assembly 7, the support arm 4, the recording disk 1 and the drive motor 13 exists;

(b) successively selecting different one of a plurality of frequencies in the frequency range as a frequency of alternate drive signals applied to the drive motor 13 to oscillate the recording disk 1, the stuck head/slider assembly 7 and the support arm 4 in each successive frequency;

(c) detecting an amplitude of the counterelectromotive force induced in the voice coil motor 11 in each successive frequency;

(d) selecting a frequency at which the largest amplitude of the counterelectromotive force is generated; and (e) applying the alternate drive signals at the selected frequency to the drive motor 13.

The first mode includes steps (a) through (d), and the second mode includes step (e) of the above steps.

Figure 10:
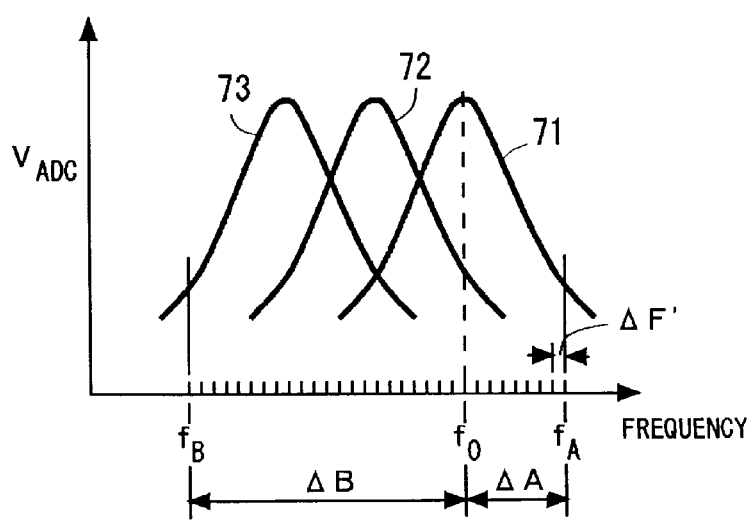
FIG. 10 shows the frequency range of the drive current for unsticking the head/slider assembly from the surface of the disk.

The main control circuit 16 further performs the operation including the steps of:

(a) setting a first frequency range defined by two frequencies $f_{MIN}$ and $f_{MAX}$ between which the resonant frequency of the mechanical system containing the head/slider assembly 7, the support arm 4, the recording disk 1 and the drive motor 13 exists;

(b) successively selecting different one of a plurality of frequencies in the first frequency range as a frequency of the alternate drive signals applied to the drive motor 13 to oscillate the recording disk 1, the stuck head/slider assembly 7 and the support arm 4 in each successive frequency;

(c) detecting the amplitude of the counterelectromotive force induced in the voice coil motor 11 in each successive frequency;

(d) selecting the frequency at which the largest amplitude of the counterelectromotive force is generated;

(e) setting a second frequency range containing the selected frequency, which is narrower than the first frequency range, as shown in FIG. 10; and (f) applying the alternate drive signals at successively selected different one of a plurality of frequencies in the second frequency range to the drive motor 11.

The first mode includes steps (a) through (e), and the second mode includes step (f).

The main control circuit 16 starts the first mode in block 40 in FIG. 6 when the circuit 16 detects the sticking of the head/slider assembly to the surface of the disk 1. The operation proceeds to block 41 in which the supply of the current $I_{SPN}$ to the spindle motor 13 is stopped, the supply of the current $I_{VCM}$ to the VCM 11 is stopped, and voltage $V_{ADCOFFSET}$ an input terminal of the ADC 18 is measured.

The voltage $V_{ADCOFFSET}$ represents an operating point of the ADC 18, as shown in FIG. 4. The main control circuit 16 stores the value of the voltage $V_{ADCOFFSET}$ in the memory 17 for later use.

Figure 9:
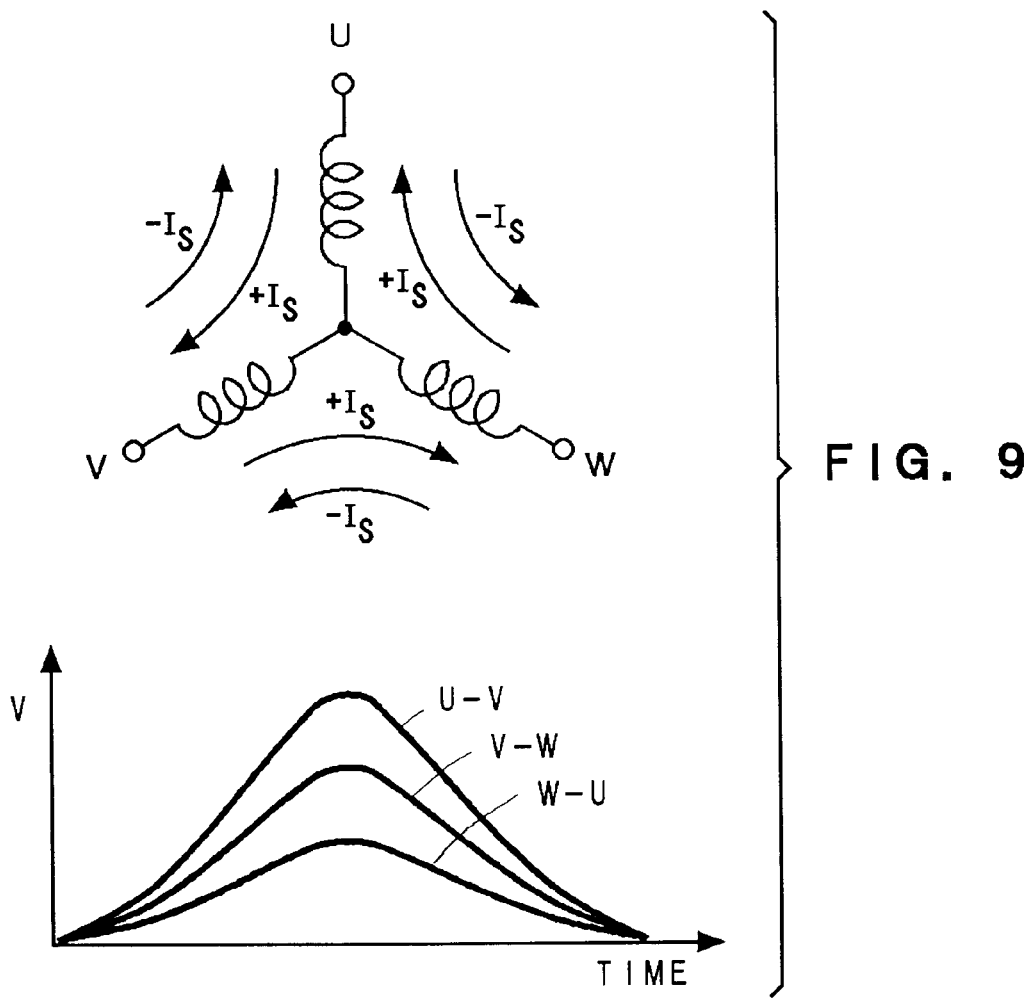
FIG. 9 shows the phase coils of the spindle motor.

The operation proceeds to block 42 in which two phases of three phases of the spindle motor 13 are selected. Describing the phases of the spindle motor 13 with reference to FIG. 9, the spindle motor 13 has the three phases U, V and W. The counterelectromotive force induced in the coil of the VCM 11 may differ from each other, as shown in FIG. 9, when each of the coils U-V, V-W and W-U is driven. Therefore, the counterelectromotive force generated by all the coils are detected. In block 42, one of them, the phases U-V, for example is selected. The operation proceeds to block 43 in which the first frequency for vibrating or oscillating the spindle motor 13 and the disk 1 is selected, the amplitude of the driving current $I_{SPN}$ of the spindle motor is set to $I_S$, the supply of current to the VCM 11 is stopped ($I_{VCM}$=0), and a value in the $V_{ADCMAX}$ latch 26 in the main control circuit 16 for storing the $V_{ADCMAX}$ is reset to zero. Describing the first frequency, the frequency range $f_{MIN}$–$f_{MAX}$ for vibrating the spindle motor 13 is predetermined based upon an experimental knowledge that the resonant frequency $f_0$ exists in the frequency range $f_{MIN}$–$f_{MAX}$, as described before. Based upon the experimental knowledge, it is known that the resonant frequency $f_0$ exists in a frequency range 700 Hz–1000 Hz, for example, and the frequency range $f_{MIN}$–$f_{MAX}$ is set to a range 500 Hz–1500 Hz, for example, to cover both sides of the range 700 Hz–1000 Hz. In block 43, the first frequency f1 selected is 1500 Hz.

The operation proceeds to block 44 in which the current $\pm I_S$ is applied N times to the phase coil U-V of the spindle motor 13 at the frequency f1, such as 1500 Hz, as shown in a time period T1 in FIG. 4 and shown in FIG. 9. In the exemplary case, N=3, so that the disk 1 oscillates or vibrates at the frequency f1 three times. It is assumed that the resonant frequency $f_0$ exists in the time period T5, so that the moving distance ±M1, ±M2 and the amplitude of the counterelectromotive force in the time period T5 becomes the largest value. As shown in the curves 24 and 25 in the time T1–T5 of FIG. 4, the amplitude gradually increases as the frequency is decreased from f1 to f5.

The operation proceeds to block 45 in which the values of the $V_{ADC}$ curve 25 at sample points 25A and 25B in the time period T1 is sampled. The sample points 25A and 25B are set just before the falling edge and the rising edge since peaks of the $V_{ADC}$ curve are located just before the falling edge and the rising edge of the waveform 23, respectively, as shown in the time period T5.

The operation proceeds to block 46 in which the value $|V_{ADC}-V_{ADCOFFSET}|$ is compared with the $V_{ADCMAX}$ in the $V_{ADCMAX}$ register 26, which is zero in this case since the value is reset to zero in block 43. Describing the value $|V_{ADC}-V_{ADCOFFSET}|$, this value $|V_{ADC}-V_{ADCOFFSET}|$ is a voltage difference between the value at the point 25A and the $V_{ADCOFFSET}$ which is the operating point of the ADC 18, as shown in the waveform 25 in the time periods T4 and T5.

If the answer of the comparison is NO, the operation proceeds to block 48; and if the answer of the comparison is YES, the operation proceeds to block 47. In this case, the value $|V_{ADC}-V_{ADCOFFSET}|$ at the point 25A of the $V_{ADC}$ curve 25 in the time period T1 is larger than the value zero in the $V_{ADCMAX}$ register 26, the operation proceeds to block 47.

The operation of block 47 replaces the value $V_{ADCMAX}$ (value zero) stored in the $V_{ADCMAX}$ register 26 by the larger value determined by the comparison, and stores the frequency, in this case f1, producing the larger value $|V_{ADC}-V_{ADCOFFSET}|$ in the frequency register 27 as OSCFREQ.

Therefore, block 47 updates the value in the $V_{ADCMAX}$ register 26 to the largest value of the $|V_{ADC}-V_{ADCOFFSET}|$, and updates the frequency (OSCFREQ) in the frequency register 27 to the frequency which produces the largest value of the $|V_{ADC}-V_{ADCOFFSET}|$, for later use.

The operation proceeds to block 48, shown in FIG. 7, in which the main control circuit 16 determines whether or not the stuck head/slider assembly 7 is unstuck from the surface of the disk 1 and the spindle motor 13 is rotated by the vibration of the disk 1 at the frequency F1. If the answer of block 48 is YES, the operation proceeds to an end block 67, shown in FIG. 8; and the operation for unsticking the stuck head/slider assembly 7 from the surface of the disk 1 is terminated. If the answer of block 48 is NO, the operation proceeds to block 49 in which the main control circuit 16 determines whether or not the frequency used now is smaller than the frequency $f_{MIN}$, i.e., 500 Hz. If the answer of block 49 is YES, the operation proceeds to block 51; and if the answer is NO, the operation proceeds to block 50 in which a next frequency f2 is selected by decrementing the current frequency by a predetermined value. The operation returns to block 44, and the operation of blocks 44 through 49 is repeated at the frequency f2. This loop of operation is repeated until the frequency reaches the $f_{MIN}$.

It is noted that the value $|V_{ADC}-V_{ADCOFFSET}|$ is gradually increased from the time period T1 using the frequency f1 to the time period T5 using the frequency f5, and the value $|V_{ADC}-V_{ADCOFFSET}|$ is gradually decreased from the time period T5 using frequency f5 to the time period T7 using the frequency f7, as shown in FIGS. 4 and 5. Therefore, the update of the value in the $V_{ADCMAX}$ register 26 and the frequency register 27 performed in block 47 is made from the time period T1 to the time period T5. More particularly, the value in the $V_{ADCMAX}$ register 26 is gradually increased from the time period T1 to the time T5, and the value of the frequency in the frequency register 27 is gradually decreased. At the time period T5, the value in the $V_{ADCMAX}$ register 26 is the $|V_{ADC}-V_{ADCOFFSET}|$ of the time period T5, and the value of the frequency in the frequency register 27 is f5.

The $V_{ADCMAX}$ register 26 and the frequency register 27 keep these values during the time periods T6 and T7, since the value $|V_{ADC}-V_{ADCOFFSET}|$ is gradually decreased from the time period T5 to the time period T7.

As described before, the frequency range $f_{MIN}-f_{MAX}$ is the 500 Hz–1500 Hz, and the next frequency is selected by decrementing the current frequency by a predetermined value, such as 50 Hz in block 50. However, only frequencies f1 through f7 are shown in FIGS. 4 and 5, for simplifying the description and the drawings.

When the final frequency, i.e., $f_{MIN}$, has been used, the answer of block 49 is YES. The operation proceeds to block 51 in which the main control circuit 16 determines whether or not the value $|V_{ADC}-V_{ADCOFFSET}|$ stored in the $V_{ADCMAX}$ register 26 exceeds a threshold value. Based upon the experimental knowledge, it is possible to estimate an expected maximum value of the $|V_{ADC}-V_{ADCOFFSET}|$. The threshold value used in block 51 can be set to a value=(⅔× the expected maximum value), for example.

If the answer of block 51 is YES, the operation proceeds to block 54 in which a flag is set to "0". The setting of the flag to "0" indicates that, as a result of the operation using the phase coil U-V, the $V_{ADCMAX}$ value exceeding the threshold value and its frequency treated as the resonant frequency $f_0$ are found; and, hence, using the other phase coil, such as the V-W coil or the W-U coil, is not required. If the answer of block 51 is NO, that is, the $V_{ADCMAX}$ value exceeding the threshold value was not obtained, the operation proceeds to block 52 in which the main control circuit 16 determines whether or not all the phases shown in FIG. 9, i.e., the U-V, V-W and W-U, has been selected. In this case, only the phase U-V has been used; and, hence, the answer of block 52 is NO. The operation proceeds to block 53 in which the next phase, such as the V-W, is selected.

The operation returns to block 43, and the operation of blocks 43 through 52 are repeated.

In a rare case, the answer of block 51 is NO and the answer of block 52 is YES. This case shows that the desired resonant frequency $f_0$ was not found, although all the phase coils were used. In this case, the flag is set to value "1". This case might happen when the center line 21 of the support arm 4, shown in FIG. 3, becomes perpendicular to the line 22, and the vector component ±M2 can not be generated. However, it is estimated based upon the experimental study that the probability of occurrence of the case is less than 0.1%.

The operation proceeds to block 56 in which the first mode for searching the resonant frequency $f_0$ is terminated.

The second mode for unsticking the stuck head/slider assembly from the surface of the disk 1 is started at block 57.

The operation proceeds to block 58 in which the current ISPIN applied to the spindle motor 13 is set to the IS and a current applied to the VCM 11 is set to a predetermined value IV.

The operation proceeds to block 59 in which one of the phase coils of the spindle motor 13, such as the coils U-V, is selected.

It is noted that the operation performed from block 60 to the end block 67 are classified into the following two operations depending upon the value of the flag set in blocks 54 and 55. The first operation is performed when the flag is "0", which indicates that the desired resonant frequency $f_0$ is found. The second operation is performed when the flag is "1", which indicates finding the resonant frequency failed.

Describing the first operation, i.e., the value of the flag is "0", the main control circuit 16 treats the frequency OSC-FREQ stored in the frequency register 27 in the block 47 as the resonant frequency $f_0$, and establishes a frequency range defined by an upper frequency $f_A$ and a lower frequency $f_B$, as shown in FIG. 10, by adding ΔA and ΔB to both sides of the resonant frequency $f_0$. The actual frequency $f_0$ of the mechanical system after the first mode, which contains the head/slider assembly 7, the support arm 4, the disk 1 and the spindle motor 13, may be shifted from the value of OCS-FREQ stored in the frequency register 27. To compensate this shift, the ΔA and the ΔB are added. It is noted that the ΔA, which is a difference between the upper frequency $f_A$ and the resonant frequency $f_0$, is narrower than the ΔB which is a difference between the resonant frequency $f_0$ and the lower frequency $f_B$ for the following reason.

It is assumed that two magnetic recording disks and four head/slider assemblies and support arms are contained in the hard disk drive device, and all the head/slider assemblies are stuck to the surfaces of the disks, respectively. If one of the head/slider assemblies is unstuck from the surface of the disk by the vibration or oscillation of the disk and the VCM at the resonant frequency $f_0$ of a curve 71, the resonant frequency $f_0$ is shifted or decreased to a curve 72. If the next one of the head/slider assemblies is unstuck from the surface of the disk, the resonant frequency $f_0$ is shifted or decreased to a next curve 73. In this manner, the resonant frequency $f_0$ is shifted toward the frequency $f_B$ in the range ΔB; and, hence, ΔB is selected to be larger than range ΔA.

Referring to block 60 again, the main control circuit 16 sets the first frequency to the frequency $f_A=f_0+ΔA$. The operation proceeds to block 61 in which the current ±IS and IV at the frequency $f_A$ are applied to the spindle motor 13 and the VCM 11 M times, respectively.

The operation proceeds to block 62 in which the main control circuit 16 determines whether or not the head/slider assembly 7 is unstuck from the surface of the disk 1 and the disk 1 is rotated. If the answer of block 62 is YES, the operation proceeds to the end block 67 and the operation is terminated. If the answer of block 62 is NO, the operation proceeds to block 63 in which the main control circuit 16 determines whether or not the current frequency is smaller than the frequency $f_B$. If the answer of block 63 is YES, the operation proceeds to block 65. If the answer of block 63 is NO, the operation proceeds to block 64 which generates the second frequency by decreasing the current frequency by a ΔF' (for example, 5 Hz). The operation returns to block 61, and the above described operations are repeated by using the second frequency.

In this manner, the operation of blocks 61 through 63 are repeated by sequentially decreasing the frequency by the ΔF'. When the frequency reaches the $f_B$, the answer of block 63 is YES, and the operation proceeds to block 65 in which the main control circuit 16 determines whether or not all the phases U-V, V-W and W-U have been selected. In this case, only the phase U-V has been used, the answer of block 65 is NO, and the operation proceeds to block 66 in which the next phase coil V-W or W-U is selected.

The operation returns to block 60, and the operation from block 60 to block 65 is repeated. In a case in which the answer of block 62 is NO, the answer of block 63 is YES, and the answer of block 65 is YES, the operation is terminated. This case indicates that the stuck head/slider assembly 7 was not unstuck from the surface of the disk 1 and the spindle motor 13 was not rotated although the operation for unsticking the stuck head/slider assembly 7 using all the phase coils. The main control circuit again detects the stop of the spindle motor 13, and restarts the operation from the first block 40 in FIG. 6. It was confirmed in the experimental study that the probability of occurrence of the restart was very low, and the probability of the occurrence of the answer YES from block 62 was very high. Describing the second operation in which the flag "1" indicates finding the resonant frequency $f_0$ is failed, the frequency over the full range $f_{MIN}$–$f_{MAX}$ is used, and the frequency is shifted from $f_{MAX}$ to $f_{MIN}$ in the operation from block 60 to block 67.

Although the first frequency f1 is set to $f_{MAX}$ in block 43 and the frequency is gradually decreased from $f_{MAX}$, it is possible to select the $f_{MIN}$ as the first frequency in block 43, and the frequency is gradually increased from $f_{MIN}$.

The present invention remarkably reduces the time period for unsticking the stuck head/slider assembly from the surface of the disk. It has been confirmed in the experimental study that the present invention can unstick the stuck head/slider assembly with the probability higher than 99.0% in the case in which the flag=1 and the case in which the operation is terminated by the answer YES of block 65.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for unsticking a head/slider assembly stuck to the surface of the magnetic recording disk which is rotated by a drive motor, the head/slider assembly being attached to a support arm which is moveable across the recording disk by a voice coil motor, the method comprising steps of:
   (a) setting a frequency range defined by two frequencies between which exist a resonant frequency of the mechanical system containing the head/slider assembly, the support arm, the recording disk and the drive motor;
   (b) successively selecting different one of a plurality of frequencies in the frequency range as a frequency of alternate drive signals applied to the drive motor to oscillate the recording disk and the head/slider assembly;
   (c) detecting an amplitude of the counterelectromotive force induced in the voice coil motor in each successive frequency;
   (d) selecting a frequency at which the largest amplitude of the counterelectromotive force is generated; and
   (e) applying alternate drive signals at the frequency selected in step (d) to the drive motor or voice coil motor.

2. A method according to claim 1, wherein the alternate drive signals of step (e) are applied to the drive motor and the voice coil motor to oscillate the head/slider assembly.

3. A method for unsticking a head/slider assembly stuck to the surface of a magnetic recording disk which is rotated by a drive motor, the head/slider assembly being attached to a support arm which is moveable across the recording disk by a voice coil motor, the method comprising steps of:
   (a) setting a first frequency range defined by two frequencies between which exist a resonant frequency of the mechanical system containing the head/slider assembly, the support arm, the recording disk and the drive motor;
   (b) successively selecting different one of a plurality of frequencies in the first frequency range as a frequency of alternate drive signals applied to the drive motor to oscillate the recording disk, and the head/slider assembly;
   (c) detecting an amplitude of the counterelectromotive force induced in the voice coil motor for each successive frequency;
   (d) selecting a frequency at which the largest amplitude of the counterelectromotive force is generated;
   (e) setting a second frequency range which is narrower than the first frequency range and contains the selected frequency selected in step (d); and
   (f) applying the alternate drive signals to the drive motor at successively selected different one of the plurality of frequencies in the second frequency range.

4. A method according to claim 3, wherein the alternative drive signals of step (f) are also applied to the voice coil motor to oscillate the head/slider assembly.

5. A method according to claim 4, wherein the second frequency range is defined by an upper frequency higher than the selected frequency and a lower frequency lower than the selected frequency, and a difference between the upper frequency and the selected frequency is smaller than a difference between the selected frequency and the lower frequency.

6. A method according to claim 5, wherein the frequency of the alternate drive signals in step (f) is decremented from the upper frequency to the lower frequency.

7. A disk drive device comprising:
   (a) a magnetic recording disk mounted for rotation on a drive motor;
   (b) a head/slider assembly attached to a supporting arm, the head/slider assembly is moveable along a radial direction of the recording disk by a voice coil motor;
   (c) a first detecting means for detecting the sticking of the head/slider assembly to the surface of the magnetic recording disk and generating a detecting signal;
   (d) a setting means responding to the detecting signal for setting a frequency range defined by two frequencies between which exists a resonant frequency of the mechanical system containing the head/slider assembly, the support arm, the recording disk and the drive motor;
   (e) an actuating means for successively selecting different one of a plurality of frequencies in the frequency range as a frequency of alternate drive signals applied to the drive motor to oscillate the recording disk;
   (f) a second detecting means for detecting an amplitude of the counterelectromotive force induced in the voice coil motor in each successive frequency;
   (g) a selecting means for selecting a frequency at which the largest amplitude of the counterelectromotive force is generated; and
   (h) an applying means for applying the alternate drive signals at the frequency selected by selecting means to the drive motor.

8. A disk drive device according to claim 7, wherein the applying means also applies alternate drive signals at the selected frequency to the voice coil motor to oscillate the head/slider assembly.

9. A disk drive device comprising:

(a) a magnetic recording disk mounted for rotatable movement on a drive motor;

(b) a head/slider assembly attached to a supporting arm, the head/slider assembly is moveable along a radial direction of the recording disk by a voice coil motor;

(c) a first detecting means for detecting a sticking of the head/slider assembly to the surface of the recording disk and generating a detecting signal;

(d) a first setting means responding to the detecting signal for setting a first frequency range defined by two frequencies between which exists a resonant frequency of the mechanical system containing the head/slider assembly, the support arm, the recording disk and the drive motor;

(e) an actuating means for successively selecting different one of a plurality of frequencies in the first frequency range as a frequency of alternate drive signals applied to the drive motor to oscillate the recording disk;

(f) a second detecting means for detecting an amplitude of the counterelectromotive force induced in the voice coil motor in each successive frequency;

(g) a selecting means for selecting a frequency at which the largest amplitude of the counterelectromotive force is generated;

(h) a second setting means for setting a second frequency range which is narrower than the first frequency range containing the frequency selected by selecting means; and (i) an applying means for applying the alternate drive signals at successively selected one of a plurality of frequencies in the second frequency range to the drive motor to oscillate the recording disk.

10. A disk drive device according to claim 9, wherein the applying means also applies alternate drive signals to the voice coil motor to oscillate the head/slider assembly.

11. A disk drive device according to claim 10, wherein the second frequency range is defined by an upper frequency higher than the selected frequency and a lower frequency lower than the selected frequency, and a difference between the upper frequency and the selected frequency is smaller than a difference between the selected frequency and the lower frequency.

12. A disk drive device according to claim 11, wherein the frequency of the alternate drive signals is decremented from the upper frequency to the lower frequency.

* * * * *